June 21, 1927.
J. W. GIEST
1,632,831
OPERATING TABLE FOR ANIMALS
Filed Jan. 7, 1926
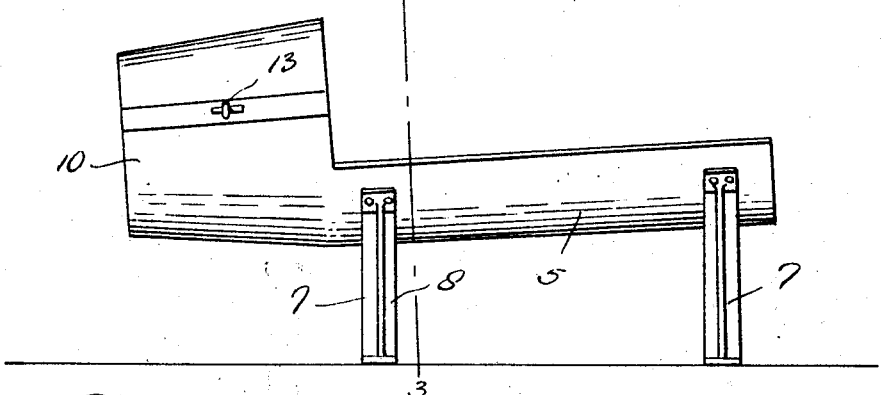
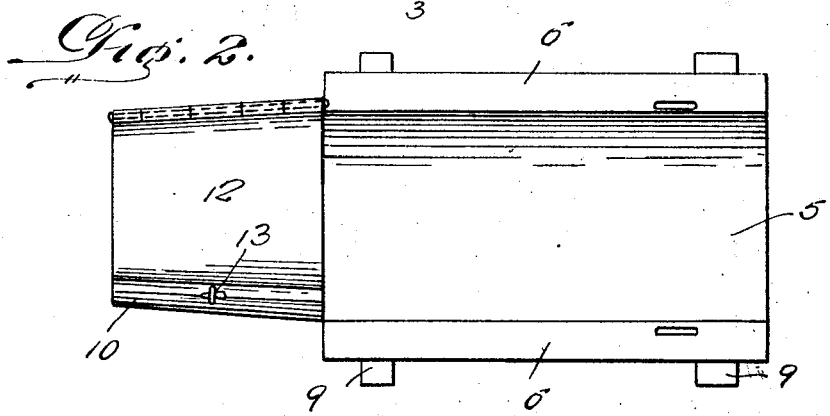
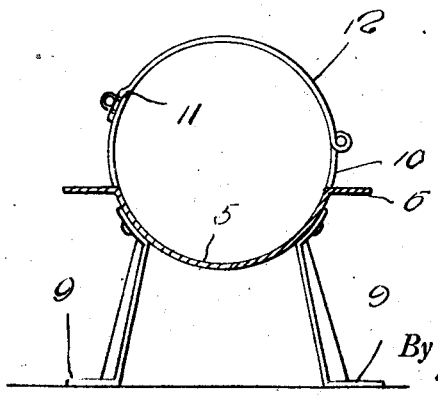
Inventor
J. W. Giest,
By Clarence A. O'Brien
Attorney Patented June 21, 1927.

1,632,831

UNITED STATES PATENT OFFICE.

JOHN W. GIEST, OF ELY, MISSOURI.

OPERATING TABLE FOR ANIMALS.

Application filed January 7, 1926. Serial No. 79,804.

This invention relates to animal operating tables, and has particular reference to means whereby an animal may be laid upon its back and so held in order that he may be castrated, rung, or whereby similar operations may be performed in a satisfactory manner, the table being so constructed as to absolutely prevent the escape of the animal and to prevent the animal from moving off of his back.

The primary object of the invention is to substantially improve and simplify over similar types of operating tables now used.

With the foregoing and other objects in view as the nature of the invention will be better understood, the same comprises the novel form, combination, and arrangement hereinafter more fully shown in the accompanying drawing, and claimed.

In the drawing wherein like reference characters indicate corresponding parts throughout the several views:

Figure 1 is a side elevation of my improved operating table.

Figure 2 is a top plan view thereof, and

Figure 3 is a detail vertical section taken substantially upon the line 3—3 of Figure 1, looking in a direction toward the head holding end of the table.

Now having particular reference to the drawing, my novel operating table for animals constitutes the provision of a semi-cylindrical trough shaped animal resting table 5, the upper longitudinal edges of which are provided with outwardly extending flanges 6—6 for presenting flat edges for obviously preventing the scratching or cutting of the animal resting on his back upon said table.

Depending from the table 5 at its forward and rear ends and at its opposite sides are supporting legs 7 preferably of sheet metal, and formed with reinforcing ribs 8, the opposite end thereof being outwardly bent in such a manner as to permit of the attachment of the same at certain ends to the table 5 and to present feet 9 at the lower end thereof. The rearmost pair of legs are of slightly greater length than the foremost pair in order that the table 5 will be supported in the slightly elevated position shown in Figure 1.

The forward end of the table 5 is formed with a funnel shaped extension 10 that is provided at its top side and throughout its length with an opening 11 adapted to be closed by a swinging door 12 in order that the neck of the animal being positioned therein may be so secured as to prevent escape from the table.

Suitable means 13 is provided whereby the door 12 may be secured in closed position over the neck of the animal.

It will thus be seen that I have provided a highly efficient and simple, and inexpensively constructed operating table for animals that is a substantial improvement over similar devices now used.

Minor changes may be made in the invention without departing from the spirit and scope of the appended claim.

Having thus described the invention, what I claim is:

In an operating table for animals of the class described, a semi-cylindrical trough shaped table, the longitudinal edges thereof terminating in laterally disposed flanges, supporting legs at the front and rear ends of the table, the rear legs being of a greater height than the forward legs in order that the table will be supported in an inclined position, a funnel shaped extension at the forward end of the table, the upper portion thereof being open, and a curved door for said opening, one longitudinal edge portion of the door being hingedly secured to one edge portion of the opening, the other edge of the door overlapping the other edge of the opening, and securing means for the free edge portion of the door.

In testimony whereof I affix my signature.

JOHN W. GIEST.